United States Patent [19]

Burn

[11] Patent Number: 4,781,397
[45] Date of Patent: Nov. 1, 1988

[54] COLLAPSIBLE TROLLEY

[75] Inventor: Michael Burn, Little Bealing, England

[73] Assignee: Cornucopia Products & Design Ltd., Suffolk, England

[21] Appl. No.: 79,493

[22] Filed: Jul. 30, 1987

[30] Foreign Application Priority Data

May 28, 1987 [GB] United Kingdom ............... 8712560

[51] Int. Cl.⁴ ............................................. B62B 1/04
[52] U.S. Cl. ............................. 280/655; 280/47.13 B; 280/47.18
[58] Field of Search ............... 280/639, 651, 652, 655, 280/47.17, 47.18, 47.13 R, 47.13 B, 414.1, 414.2, 414.3

[56] References Cited

U.S. PATENT DOCUMENTS

| | | | |
|---|---|---|---|
| 2,608,418 | 8/1952 | Finlayson et al. | 280/414.1 |
| 2,933,328 | 4/1960 | McIntyre et al. | 280/414.1 |
| 3,377,095 | 4/1968 | Allen | 280/414.1 |
| 3,831,958 | 8/1974 | Keaton | 280/42 |
| 4,037,858 | 7/1977 | Adams | 280/652 |

FOREIGN PATENT DOCUMENTS

| | | |
|---|---|---|
| 1488011 | 7/1967 | France . |
| 2337640 | 8/1977 | France . |
| 2546466 | 11/1984 | France . |

Primary Examiner—John J. Love
Assistant Examiner—Richard Camby
Attorney, Agent, or Firm—Oblon, Fisher, Spivak, McClelland, & Maier

[57] ABSTRACT

A collapsible trolley adapted for transporting and launching dinghies and like-sized boats comprises a rear axle having endwise disposed wheels and a Y-frame comprising a forward spine and trailing frame members pivotted thereto and deployable between a stowing position alongside the spine and an operational position in which the ends of the frame members remote from their spine pivot ends are releasably attachable to the axle near the ends thereof.

17 Claims, 3 Drawing Sheets

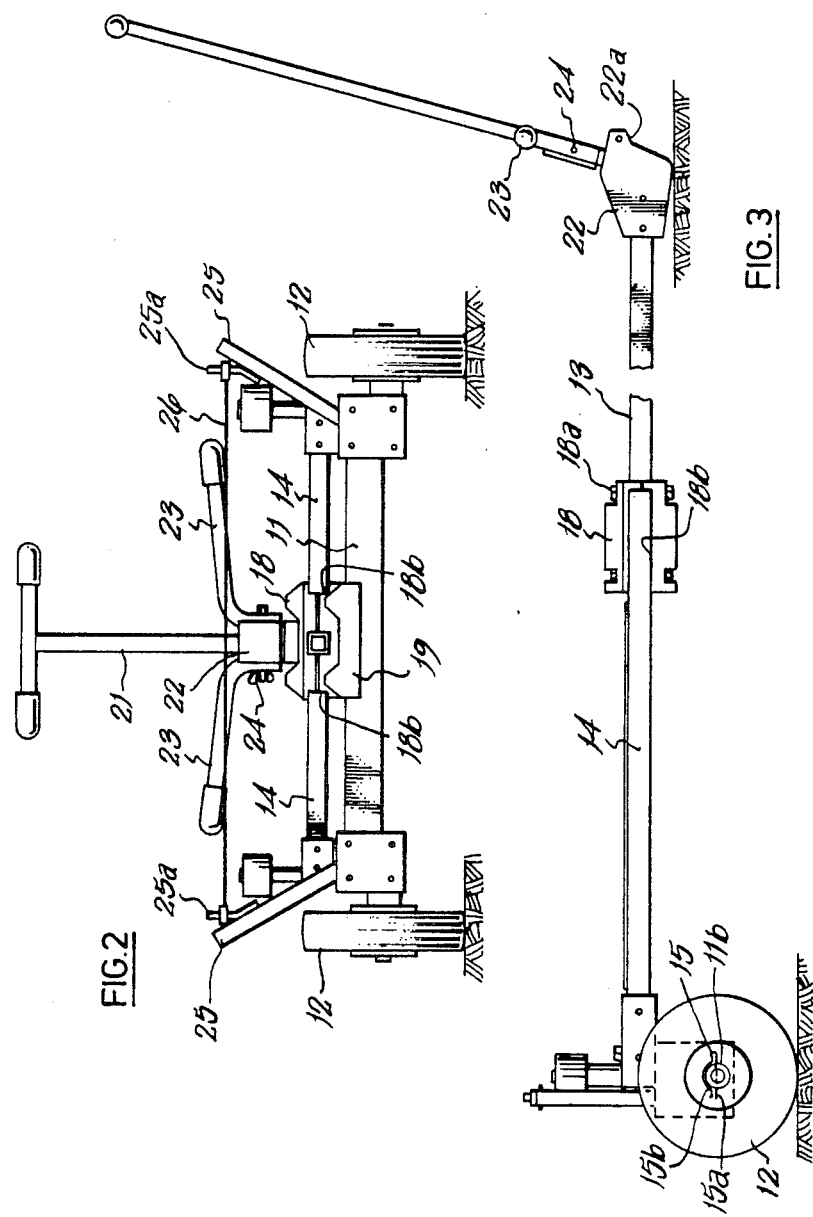

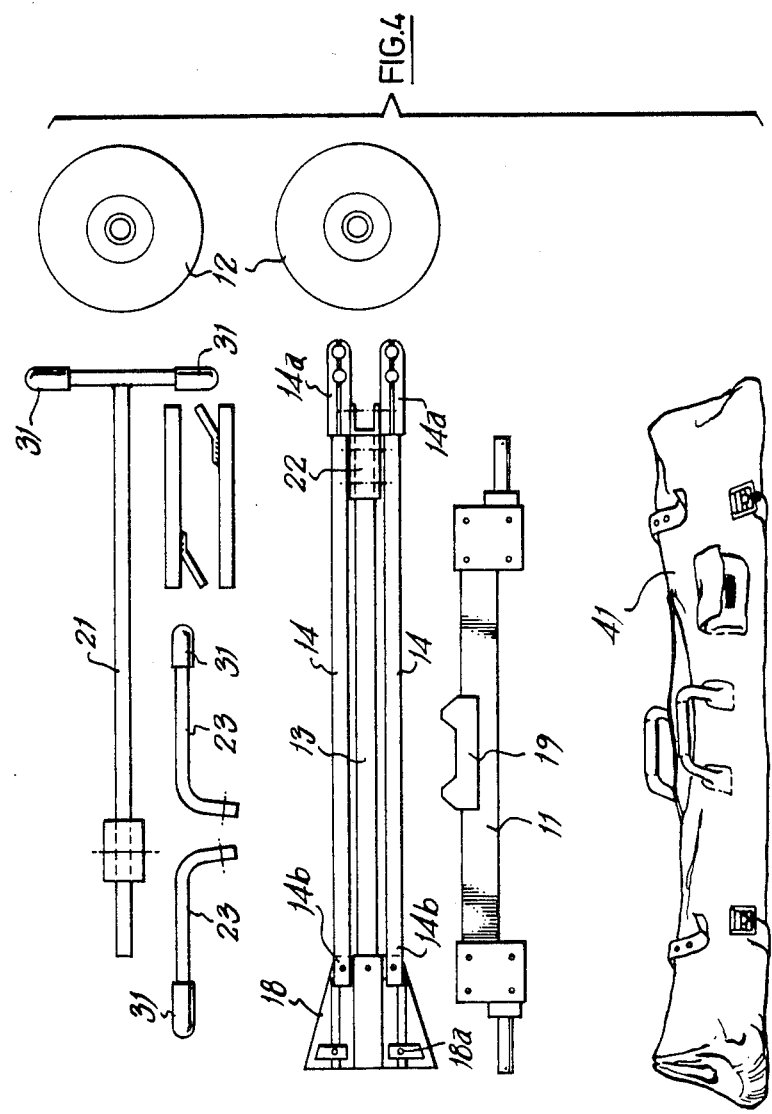

COLLAPSIBLE TROLLEY

BACKGROUND TO THE INVENTION

This invention relates to collapsible trollies intended for, but not restricted to, marine use, especially for transporting and launching dinghies and like sized craft.

Conventionally, a transportation and launching trolley comprises a frame with a handle at the front, or a towing connection and rear wheels. The boat is loaded on so that its centre of gravity is close to the wheel axis, for ease of handling. For launching, the trolley is manoeuvred into the water down a ramp or a suitably sloping beach. The boat floats off the trolley, which is brought back out of the water.

A problem with this arrangement is that now the trolley must be left at the launching site while the boat is sailed. Apart from the risk of theft of or from the trolley whilst unattended, there may be restricted parking space at the launching site especially if, as in a sailing club, many sailors are about. Moreover, the trolley is only useful for a round trip, where the boat is to be hauled out of the water, by the reverse procedure, using the trolley. The conventional trolley does not facilitate point-to-point sailing.

The present invention provides an improved trolley without these disadvantages.

SUMMARY OF THE INVENTION

The invention comprises a collapsible trolley adapted for transporting and launching dinghies and like-sized boats comprising a rear axle having endwise disposed wheels and a Y-frame comprising a forward spine and trailing frame members pivotted thereto and deployable between a stowing position alongside the spine and an operational position in which the ends of the frame members remote from their spine pivot ends are releasably attachable to the axle near the ends thereof.

The forward spine and the two said frame members may be commensurate so as to fold into the shortest length when arranged with the frame members in the stowing position. The axle may be of substantially the same length as the frame members or forward spine, and the wheels may be releasably attached to the axle.

The trolley can thereby be readily broken down into relatively short-length component parts so as to be stowable in the dinghy or other craft after launch, and indeed the provision of a bag or other container facilitates such stowing.

For a twelve to sixteen foot (say 3.5 to 4 meter)boat the trolley can be designed with maximum component length of 3 to 4 feet (say about 1 to 1.25 meter), which packed in a bag, is easily stowable.

The wheels, for ease of removal and re-assembly, may be retained on the axle by clips, which may be of the type that have a straight section that passes through a diametral bore right through the axle and a clip section sprung to the straight section that locates around one-half of the periphery of the axle.

Similar or other clips may retain the trailing frame members.

The frame members may be pivotted to the spine in the shaped member—e.g. a plastics moulding or casting providing a keel support at this location. The shaped member can support the trailing frame members when deployed in the operational position so as to form a rigid frame with no tendency to sag at the pivot point.

The axle may carry a central chock—also moulded, for example, out of plastics material—for supporting the keel—the centre of gravity of the boat will be desirably located at or near the chock position.

The trolley may comprise a forward handle releasably connected and/or pivoted o the spine, and the handle may be connected in a forward fitment on the spine (also possibly of plastics material) which can also accommodate front support means, again releasably attachable (as by a bolt and wing nut) which may comprise a pair of laterally extending arms. Such front support may be useful for adapting the trolley to carry e.g. sail or surf boards, and for stowing masts spars.

Rear lateral support means may also be provided comprising arms upstanding, perhaps outwardly splayed, from the ends of the axle and desirably extending over the wheels so as to support a load out of contact with the wheels. The rear support means can also comprise hooks for a securing strap.

Canvas support platform means may be provided, releasably attachable to the frame members to extend tautly between them when deployed in their operational position—these support means may comprise pop fasteners mating with components secured to the frame members—this provides a triangular table top, in effect, for paraphernalia such as outboards, bedding, food and so on.

BRIEF DESCRIPTION OF THE DRAWINGS.

One embodiment of collapsible trolley according to the invention will now be decribed with reference to the accompanying drawings, in which :

FIG. 2 is a rear elevation of the trolley illustrated in FIG. 1;

FIG. 3 is a side elevation of the same trolley; and

FIG. 4 , is a view of the trolley broken down into its dismantled condition and a storage bag for it.

Figure 1:
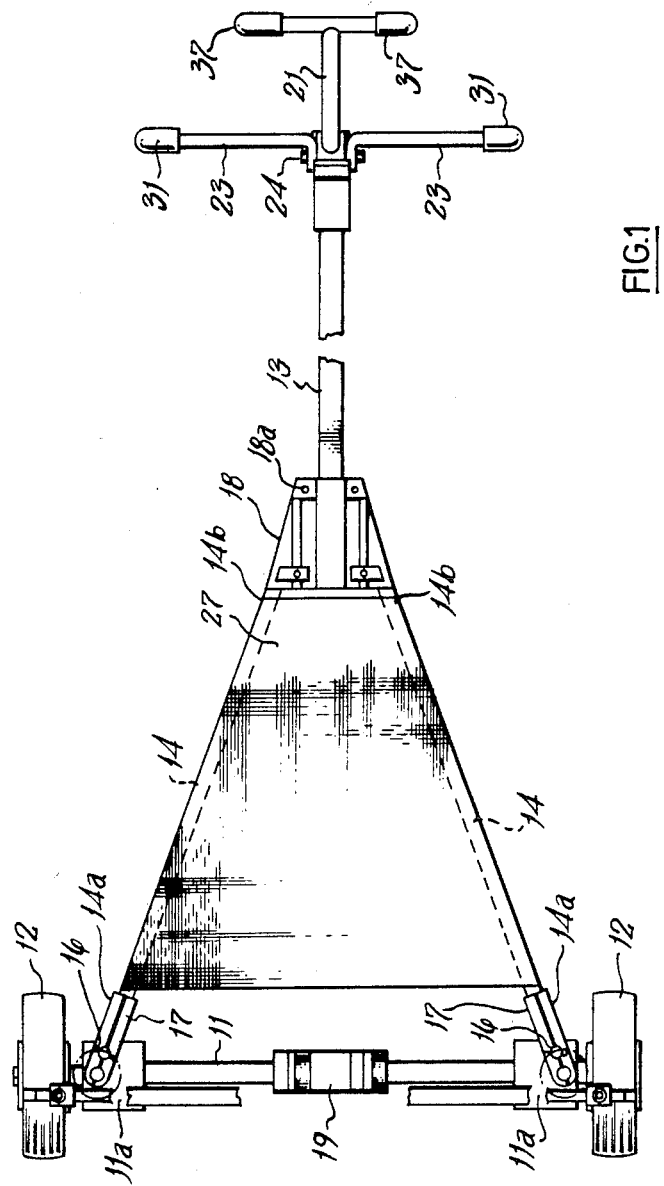
FIG. 1 is a plan view of the trolley in its operational condition.

DETAILED DESCRIPTION OF THE PREFERRED EMBODIMENT.

The drawings illustrate a collapsible trolley adapted for transporting and launching dinghies and like-sized boats (see the outline indications thereof in broken lines).

The trolley comprises a rear axle 11 having endwise disposed wheels 12 and a Y-frame comprising a forward spine 13 and trailing frame members 14 pivotted thereto and deployable between a stowing position and FIG. 4) alongside the spine 13 and an operational position in which the ends 14a of the frame members 14 remote from their spine pivot ends 14b are releasably attachable to the axle 11 near the ends 11a thereof.

The forward spine 13 and the two frame members 14 are commensurate so as to fold into the shortest length when arranged with the frame members 14 in the stowing position, and the axle 11 is of substantially the same length as the frame members 14 or spine 13. As will be seen, a trailer which, when operational will support say a twelve to sixteen feet (say 3.5 to 4 meter) boat will be some six to eight feet (say about 2 to 2.5 m) in length from the forward end 13a of the spine to the axle 11 yet pack down into components each of length about 3 to 4 feet (1 to 1.25 meters).

When packed into a bag 41 (FIG. 4) the whole trolley is easily carried in the dinghy which it carried and launched.

The wheels 12 are releasably attached to the axle 11 by clips 15 which have a straight pin section 15a that passes through a diametral bore 11b right through the axle 11 and a clip section 15b sprung to the straight pin section 15a that locates around one-half of the periphery of the axle.

Similar clips 16 retain the trailing frame members 14 which terminate in mouldings 17 having vertical bores 17a receiving upright posts 11c of the axle 11. The posts 11c are fixed in mouldings 11d carrying stub shafts 11e for the wheels 12.

The frame members 14 are pivotted to the spine 13 in a shaped member 18 providing a keel support—the member 18 has a shallow V-shaped upper surface and is moulded from polypropylene. It has vertical pins 18a about which the trailing frame members 14 are pivotted and edge slots 18b into which the members 14 fit when deployed in their operational position to give support against sagging when so deployed.

The rear axle 11 also carries a central chock 19, likewise moulded of polypropylene and having a V-shaped upper surface for locating and supporting a keel.

The trolley comprises a forward handle 21 releasably connected to the spine 11. The handle 21 is mounted in a further polypropylene moulding 22 which also serves as a towing connection and has a suitable pin arrangement 22a for such purpose. The handle 21 fits beyonet-fashion into a recess in the moulding 22 so as to be securable and releasable by a half turn around its axis. It will be noticed that the handle, too, is commensurate with the other frame components so as to pack neatly therewith into the bag 41.

The moulding 22 also releasably carries a pair of laterally extending arms 23, secured by a bolt and wing nut arrangement 24, which serve when attached to support e.g. sail and surf boards, spars, oars, mast and other such long items.

Rear lateral support arms 25 are provided upstanding and outwardly splayed from the ends 11a of the axle 11—in fact from the mouldings 11a—and extend over the wheels 12. Welded-on-hook members 25a are provided for a locating strap 26 which can be used to hold down long components or to underlie the keel of a boat and provide elastic lateral support.

A canvas support platform 27 is provided attached by pop fastener means to the frame members 14. This can be used for carrying such items as outboards, food, bedding and other effects.

Desirably, the frame components are made from on-corrable material such as stainless or chip-coated steel. Round or square section tube can be used as appropriate and the mouldings are secured by for example, stainless cap screws. Exposed tube ends are covered by plastic caps e.g. at 31.

Various modifications may be made to the precise nature and disposition of the various components and the invention is not to be taken at this stage as being limited to any particular combination or arrangement of components. Rather this description is a disclosure of an arrangement of which various aspects may be novel and inventive as will be reflected in later-filed patent claims.

I claim:

1. A collapsible trolley adapted for transporting and launching dinghies and like-sized boats, comprising
    (a) a rear axle having endwise disposed wheels
    (b) a Y-frame comprising a forward spine and trailing frame members pivotted thereto
    (c) said frame members being deployed by pivotting between a stowing position alongside and parallel to the spine and an operational Y shaped configuration in which the ends of the frame members remote from their spine pivot ends are releasably attachable to the axle near the ends thereof
    (d) attachment of said remote ends of said frame members to the axle constituting the sole means of attachment of said Y-frame to said axle.

2. A trolley according to claim 1, of which the forward spine and the two said frame members are commensurate so as to fold into the shortest length when arranged with the said frame members in the stowing position.

3. A trolley according to claim 1, in which the axle is of substantially the same length as the longer of the frame members or and forward spine.

4. A trolley according to claim 1, in which the wheels are releasably attached to the axle.

5. A trolley according to claim 4, in which the wheels are retained on the axle by removable clips.

6. A trolley according to claim 1, in which the trailing arms are retained on the axle by removable clips.

7. A trolley according to claim 1, in which the frame members are pivotted to the spine in a shaped member providing a keel support.

8. A trolley according to claim 1, in which the axle carries a central chock for supporting a keel.

9. A trolley according to claim 1, comprising a forward handle releasably connected to the spine.

10. A trolley according to claim 9, comprising a forward fitment on the spine for attaching the handle.

11. A trolley according to claim 1, comprising front support means releasably attachable to the spine at its forward end comprising a pair of laterally extending arms.

12. A trolley according to claim 1, comprising rear lateral support means comprising arms upstanding from the ends of the axle and extending over the wheels.

13. A trolley according to claim 1, comprising canvas support platform means releasably attachable to the frame members to extend tautly between them when deployed in their operational position.

14. A trolley according to claim 1, comprising container means for the various parts of the trolley when dismantled.

15. A trolley according to claim 14, said container means comprising a bag.

16. A collapsible trolley adapted for transporting and launching dinghies and like-sized boats comprising a rear axle having endwise disposed wheels and a Y-frame comprising a forward spine and trailing frame members pivotted thereto and deployed between a stowing position alongside and parallel to the spine and an operational Y shaped configuration in which the ends of the frame members remote from their spine pivot ends are releasably attachable to the axle near the ends thereof, and further comprising rear lateral support means comprising arms upstanding from the ends of the axle and extending over the wheels and said rear support means comprising hooks for a securing strap.

17. A collapsible trolley adapted for transporting and launching dinghies and like-sized boats comprising a rear axle having endwise disposed wheels and a Y-frame comprising a forward spine and trailing frame members pivotted thereto and deployed between a stowing position alongside and parallel to the spine and an operational Y shaped configuration in which the ends of the frame members remote from their spine pivot ends are releasably attachable to the axle near the ends thereof, comprising canvas support platform means releasably attachable to the frame members to extend tautly between them when deployed in their operational position, said canvas support means comprising pop fasteners mating with components secured to the said frame members.

* * * * *